3,024,239
PROCESS FOR THE MANUFACTURE OF QUINACRIDONES FROM 6:13-DIHYDRO-QUINACRIDONES
Armin Caliezi, Basel, Switzerland, assignor to Ciba Limited, Basel, Switzerland, a Swiss firm
No Drawing. Filed June 8, 1959, Ser. No. 818,537
Claims priority, application Switzerland June 11, 1958
8 Claims. (Cl. 260—279)

This invention is based on the observation that the known process for the manufacture of quinacridones from 6:13-dihydroquinacridones by oxidation according to the reaction

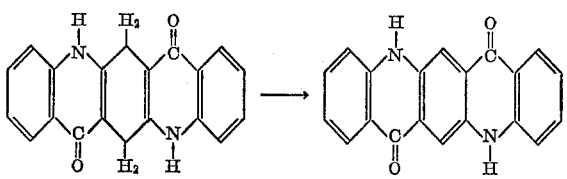

can be carried out with advantage with the use of an anthraquinone sulfonic acid as oxidizing agent.

It is known to carry out the above oxidation with the use of sodium meta-nitrobenzene sulfonate, polysulfide or oxygen as oxidizing agent. However, when the oxidation is carried out with oxygen or polysulfide it leads to unsatisfactory yields. It could not be foreseen that the oxidation could be carried out smoothly and with very good yields by the use of such unusual and weak oxidizing agents, as anthraquinone sulfonic acids. The anthraquinone derivative is converted into its leuco-compound. The latter can easily be regenerated by atmospheric oxygen completely to anthraquinone sulfonic acid, so that it is possible to use the anthraquinone sulfonic acids for almost any length of time.

However, of special practical importance is the fact that use can be made in this manner of hitherto useless compounds such, for example, as anthraquinone-2:7-disulfonic acid, which are formed in large quantities in the manufacture of anthraquinone dyestuffs.

As starting materials in the process of this invention there may be used unsubstituted or substituted 6:13-dihydroquinacridones such, for example, as dichloro-, tetrachloro-, diphenyl- and especially dimethyl-6:13-dihydroquinacridones, to form the corresponding quinacridones.

As anthraquinone sulfonic acids there may be used for example, anthraquinone-1-sulfonic acid, anthraquinone-2-sulfonic acid, anthraquinone-1:5-disulfonic acid, anthraquinone-1:6-disulfonic acid, anthraquinone-1:7-disulfonic acid, anthraquinone-1:8-disulfonic acid, anthraquinone-2:6-disulfonic acid and advantageously anthraquinone-2:7-disulfonic acid preferably in the form of salts thereof. There may also be used anthraquinone trisulfonic acids and anthraquinone tetrasulfonic acids.

In accordance with this invention the oxidation is carried out in alkaline solution, advantageously in an alcoholic solution of potassium hydroxide or sodium hydroxide. As solvents there may be used a very wide variety of solvents such, for example, as methanol, ethanol, propanol, butanol or glycols, advantageously in the form of alkali metal alcoholates, or acetone etc.

The following examples illustrate the invention, the parts and percentages being by weight:

*Example 1*

3.14 parts of 6:13-dihydroquinacridone are heated under reflux in 100 parts of ethanol and 2 parts of potassium hydroxide. A solution of 6.3 parts of anthraquinone-2:7-disulfonic acid in the form of its sodium salt in 20 parts of water is slowly added dropwise. The whole is then boiled for a further 2 hours under reflux, and the precipitated product is filtered off. It is washed with water and alcohol. There are obtained 3.04 parts of a bright red powder consisting of quinacridone.

Instead of 6:13-dihydroquinacridone, there may be used 2:9-diphenyl-6:13-dihydroquinacridone, 2:4:9:11-tetrachloro-6:13 - dihydroquinacridone, 3:10 - dichloro-6:13-dihydroquinacridone or 2:3:9:10-tetrachloro-6:13-dihydroquinacridone, whereby these compounds are oxidized to the corresponding quinacridone derivatives.

*Example 2*

3.42 parts of 2:9-dimethyl-6:13-dihydroquinacridone are heated under reflux in 100 parts of ethanol and 2 parts of sodium hydroxide, and then 6.2 parts of sodium anthraquinone-2-sulfonate dissolved in 36 parts of hot water are added dropwise. The whole is then heated for a further 8 hours under reflux, and the precipitated 2:9-dimethylquinacridone is isolated in the manner described in Example 1.

What is claimed is:
1. In a process for the manufacture of a quinacridone by the oxidation of the corresponding 6:13-dihydroquinacridone in alkaline solution, the improvement of mixing the 6:13-dihydroquinacridone with anthraquinone-2:7-disulfonic acid as oxidizing agent and refluxing the mixture.

2. In a process for the manufacture of a quinacridone by the oxidation of the corresponding 6:13-dihydroquinacridone, the improvement of mixing the 6:13-dihydroquinacridone with an aqueous solution of anthraquinone-2:7-disulfonic acid in the presence of a water-soluble alcohol and an alkali metal hydroxide in the solution, and refluxing the mixture at a temperature of up to 100° C.

3. In a process for the manufacture of a quinacridone by the oxidation of the corresponding 6:13-dihydroquinacridone in alkaline solution, the improvement of mixing the 6:13-dihydroquinacridone with anthraquinone-2:7-disulfonic acid as oxidizing agent and refluxing the mixture so as to obtain the corresponding quinacridone and the corresponding leuco compound of the anthraquinone sulfonic acid, contacting the said leuco-compound with atmospheric oxygen so as to regenerate the anthraquinone sulfonic acid, and recycling the latter into the process for admixture with further 6:13-dihydroquinacridone.

4. The improvement defined in claim 2 wherein 2:9-dimethyl-6:13-dihydroquinacridone is the starting material.

5. The improvement defined in claim 2 wherein 2:9-diphenyl-6:13-dihydroquinacridone is the starting material.

6. The improvement defined in claim 2 wherein 2:4:9:11-tetrachloro-6:13 - dihydroquinacridone is the starting material.

7. The improvement defined in claim 2 wherein 3:10-dichloro-6:13-dihydroquinacridone is the starting material.

8. The improvement defined in claim 2 wherein 2:3:9:10-tetrachloro-6:13 - dihydroquinacridone is the starting material.

References Cited in the file of this patent
UNITED STATES PATENTS
2,821,530   Struve _____ Jan. 28, 1958
FOREIGN PATENTS
893,699    Germany _____ Oct. 19, 1953